United States Patent
Ishida et al.

(10) Patent No.: US 7,170,073 B2
(45) Date of Patent: Jan. 30, 2007

(54) STAINLESS STEEL PRODUCT CONTAINING B AND METHOD FOR PRODUCTION THEREOF

(75) Inventors: Kazuhiro Ishida, Kitakyushu (JP); Kazuhiro Ogawa, Nishinomiya (JP); Takeo Yazawa, Kashima (JP); Hideaki Yamamoto, Kashima (JP); Hideo Morisaki, Kashima (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 134 days.

(21) Appl. No.: 11/076,943

(22) Filed: Mar. 11, 2005

(65) Prior Publication Data

US 2005/0183796 A1    Aug. 25, 2005

Related U.S. Application Data

(63) Continuation of application No. PCT/JP03/11276, filed on Sep. 3, 2003.

(30) Foreign Application Priority Data

Sep. 11, 2002 (JP) .............................. 2002-265046
Mar. 27, 2003 (JP) .............................. 2003-086979

(51) Int. Cl.
*C22C 38/32* (2006.01)
*B21B 3/02* (2006.01)
*B23K 9/04* (2006.01)

(52) U.S. Cl. ................... 250/518.1; 228/199; 228/214; 228/223; 148/24; 148/26; 250/506.1; 420/46; 420/64; 420/106; 420/108; 420/112; 420/121

(58) Field of Classification Search ..................... None
See application file for complete search history.

(56) References Cited

U.S. PATENT DOCUMENTS 3,854,938 A * 12/1974 Baybrook et al. ............. 420/46
4,341,555 A *  7/1982 Douthett et al. .............. 420/42
4,521,691 A    6/1985 Christ et al.

FOREIGN PATENT DOCUMENTS

EP        1046723 A1    10/2000

(Continued)

*Primary Examiner*—Jack I. Berman
(74) *Attorney, Agent, or Firm*—Clark & Brody

(57) ABSTRACT

A stainless steel slab containing B, wherein a protecting material is joined onto at least two faces across the bloom from each other in a stainless steel bloom containing B of 0.3–2.5 mass %, being integrated into one-piece by forming a weld metal comprising a stainless steel with chemical composition that satisfies the relationship expressed by following formulas (1)–(4), and a method to produce a steel product by rolling said slab. Further, it is preferable to interpose an insert material between above stainless steel bloom and above protecting material in bonding process.

$$15 \leq Cr\ eq \leq 30, \quad (1)$$

$$4 \leq Cr\ eq\text{-}Ni\ eq \leq 17, \quad (2)$$

$$Cr\ eq = Cr + 1.5\ Si + Mo - 5\ B, \quad (3)$$

$$Ni\ eq = Ni + 30\ (C+N) + 0.5\ Mn \quad (4)$$

Herein, each symbol of a chemical element designates the content (mass %) of relevant chemical element contained in steel. Accordingly, it makes it possible to subject a stainless steel slab containing B to hot working without generating edge cracking, so as to be used as a source material of a neutron shielding container and a separator of a fuel cell.

12 Claims, 3 Drawing Sheets

FOREIGN PATENT DOCUMENTS

| | | |
|---|---|---|
| EP | 1 061 598 A1 | 12/2000 |
| JP | 61-117257 | 6/1986 |
| JP | 63-013664 | 1/1988 |
| JP | 63-076703 | 4/1988 |
| JP | 04-253506 | 9/1992 |
| JP | 09-269398 | 10/1997 |
| JP | 2001-032056 | 2/2001 |
| JP | 2001-239364 | 9/2001 |
| WO | WO 95/30990 | 11/1995 |

* cited by examiner

STAINLESS STEEL PRODUCT CONTAINING B AND METHOD FOR PRODUCTION THEREOF

This application is a continuation of International Patent Application No. PCT/JP2003/011276, filed Sep. 3, 2003. This PCT application was not in English as published under PCT Article 21(2).

FIELD OF THE INVENTION

The present invention relates to a stainless steel slab containing B as well as a stainless steel product containing B for use of a neutron shielding material in equipments regarding nuclear power plants such as a nuclear fuel transport cask, a storage rack of spent nuclear fuel and the like, and further for usage where an addition of B with 0.3% or more into an austenitic stainless steel should enhance the function, for instance, for use of a separator of a fuel cell, and relates to a method for production thereof.

BACKGROUND ART

A stainless steel containing B is applied as a thermal neutron control rod as well as a thermal neutron shielding material by utilizing an excellent thermal neutron absorption effect of boron (B). In general, spent nuclear fuels that were generated at a nuclear power plant is stored in a pool within a site of a nuclear power plant until being reprocessed at the reprocessing plant. Since there is a need that the spent nuclear fuels shall be stored in a limited space as much as possible, there is a tendency that a B content in a stainless steel containing B is further increased and a wall thickness of source material for components gets thinner.

Austenitic stainless steels have excellent resistance to corrosion owing to the formed passive film on the surface, and further an addition of B into it improves the electric resistance characteristic, thus enabling to be used for high conductivity electric device requiring further corrosion resistance. As an exemplified usage of high conductivity electric device requiring further excellent corrosion resistance as well as low electric resistance at contact portion, there is a separator for fuel cell that generates direct current electric power by utilizing hydrogen and oxygen.

In hot working of a stainless steel containing B, the repetition of heating blooms by reheating furnace along with forging and rolling serves to prevent the temperature of a workpiece material from falling down, thus enabling hot workability to be secured. Since, as the content of B increases, the hot workability is reduced, it becomes necessary to undergo hot working process without lowering the temperature of a workpiece material, thus resulting in increasing a number of repetition of heating and hot working significantly. Accordingly, the increase of B content as well as metal forming to thin sheet amounts to the increase of production cost.

To deal with above-mentioned problem, various methods have long been attempted. For instance, in the Japanese Patent Publication No. 04-253506, there is disclosed a hot rolling method of steel slab that a workpiece material prepared in such a way that both side edge portions of a base metal comprising an austenitic stainless steel containing B of 0.3–2.0 mass % are covered with a steel member (hereinafter, may be referred to as "side plate") having lower deformation resistance by welding and are subjected to finishing rolling at the temperature of (53 B+700)° C. (where B denotes B content (mass %)) or higher, thus enabling to prevent the generation of edge cracking during rolling.

However, in this method, it is a prerequisite that the preparation of groove configuration with high accuracy for a frame material is carried out and welding itself must be performed so that the frame material would not fall apart during hot working. Therefore, in general, in applying this method to an ingot (cast ingot) or a bloomed and forged slab having a thickness of 80 mm or more, huge welding time is needed.

Also, in case of rolling a wide plate exceeding 1000 mm in width, it is likely to run into the difficulty in securing above temperature for finishing rolling, thus resulting in difficulty to practically prevent the generation of edge cracking.

Further, in case a base metal is welded with a side plate, B (boron) diffuses from a base metal to the weld metal and forms a mixture therein. Due to this, there is an occasion that cracks generate at the weld portion during rolling, causing rolling trouble and or leading to edge cracking developed from the initiation site of said cracks at the weld portion.

In the Japanese Patent Publication No. 2001-239364, there is disclosed a hot rolling method that, in hot rolling an austenitic stainless steel slab containing B of 0.3–2.5 mass %, a protecting layer of 3 mm or more in thickness being formed by overlay welding and comprising a stainless steel containing Ni of 4% or less and B of 0.1–0.4% is disposed at side edge portions of the slab.

In the Japanese Patent Publication No. 09-269398, there is disclosed a hot rolling workpiece material formed by a slab of an austenitic stainless steel containing B of 0.6–2.0 mass % and a layer by overlay weld formed at both side edge portions of said slab, a layer by overlay weld comprising a δ ferrite content of 3–12 volume %, and a B content of 0.3 mass % or less, and a thickness of 3 mm or more.

However, in this overlay welding method, a number of pass in welding increases to secure an adequate weld thickness so as to prevent the generation of cracks, thus ending up to an increase of welding time. Moreover, when weld cracks happen to generate, these cracks likely behave as an initiation site, resulting in the generation of edge cracking. Thus, it is very unlikely to completely prevent edges cracking from generating.

SUMMARY OF THE INVENTION

The present invention is intended to solve the above problems in the prior art. Accordingly, it is an object of the present invention to provide a hot rolling method as well as a cold rolling method that enable to make a stainless steel slab containing high B content by rolling down to a predetermined thickness with minimum welding time and without generating any edge cracking nor any crack at weldments, and to provide steel products containing high B content.

To be more concrete, the present invention intends to provide a stainless steel slab containing B that a protecting material is bonded at side portions thereof by high-efficiency electron beam welding, a stainless steel product containing B, and a method for production of a stainless steel product that enables to prevent a workpiece material from generating edge cracking nor cracks at weldments during hot working process.

The present inventors carried out several investigations to solve the above problems, and obtained following findings described in (a) through (d), which ending up to complete the present invention.

(a) A protecting material made of a stainless steel containing B of 0.3 mass % or less is welded onto at least two faces across the bloom from each other, excluding a working plane, in a stainless steel bloom containing B of 0.3–2.5 mass %, in such a way that the weld metal is made of a stainless steel having a specific Cr equivalent and Ni equivalent and is subsequently subjected to hot rolling, thus enabling to prevent the generation of edge cracking of steel product.

(b) With regard to the combination of a B content in a stainless steel bloom and a protecting material, in case, for instance, a stainless steel bloom containing low B like 0.3–0.7% and a protecting material containing nil B, the crack sensitivity of the weld metal gets higher, likely resulting in weld cracking. In such a case, an employment of an insert material containing B of 0.4–2.5% can prevent the generation of weld cracking.

(c) A protecting material described in above (a) is preferably bonded by high-energy-density and high-efficiency electron beam welding method, and a preferable thickness of said protecting material is 10 mm or more.

(d) A preferable condition of the electron beam welding comprises a welding current: 300 mA or more, a welding speed: 200 mm/min or less, and a scanning amplitude of electron beam: ±1.0–±3.0 mm.

The present invention is completed based on above findings, and a gist of the present invention is to provide a stainless steel slab containing B, a stainless steel product containing B, and a method for production thereof as described below respectively.

(1) A stainless steel slab containing B, wherein a protecting material made of a stainless steel containing B of 0.3 mass % or less is joined onto at least two faces across the bloom from each other, excluding a working plane, in a stainless steel bloom containing B of 0.3–2.5 mass %, being integrated into one-piece by forming a weld metal comprising a stainless steel with chemical composition that satisfies the relationships expressed by formulas (1)–(4) as below;

$$15 \leq Cr\ eq \leq 30 \tag{1}$$

$$4 \leq Cr\ eq - Ni\ eq \leq 17 \tag{2}$$

where, $$Cr\ eq = Cr + 1.5 \times Si + Mo - 5 \times B \tag{3}$$

$$Ni\ eq = Ni + 30 \times (C+N) + 0.5 \times Mn \tag{4}$$

Herein, each symbol of a chemical element designates the content (mass %) of relevant chemical element contained in steel. Hereinafter, the content of each chemical element is designated by mass %, unless otherwise specified.

(2) In a stainless steel slab according to (1) described above, it is preferable to interpose an insert material containing B of 0.4–2.5 mass % between the stainless steel bloom and the protecting material, wherein the thickness of the protecting material is preferably to be 10 mm or more.

(3) A method for production of a stainless steel product containing B, wherein a protecting material made of a stainless steel containing B of 0.3 mass % or less is joined onto at least two faces across the bloom from each other, excluding a working plane, in a stainless steel bloom containing B of 0.3–2.5 mass %, being integrated into one-piece by applying electron beam welding method to form an intervening weld metal comprising a stainless steel with chemical composition that satisfies the relationships expressed by formulas (1)–(4) as below, and subsequently subjected to heating followed by processing;

$$15 \leq Cr\ eq \leq 30 \tag{1}$$

$$4 \leq Cr\ eq - Ni\ eq \leq 17 \tag{2}$$

where, $$Cr\ eq = Cr + 1.5 \times Si + Mo - 5 \times B \tag{3}$$

$$Ni\ eq = Ni + 30 \times (C+N) + 0.5 \times Mn \tag{4}$$

Herein, each symbol of a chemical element designates the content (mass %) of relevant chemical element contained in steel.

(4) In a method for production of a stainless steel product containing B according to (3) described above, it is preferable to interpose an insert material containing B of 0.4–2.5 mass % between the stainless steel bloom and the protecting material for bonding, wherein the thickness of the protecting material is preferably to be 10 mm or more.

(5) It is preferable to utilize a stainless steel product containing B produced by the method described in above (3) for a neutron shielding container or a separator of fuel cell.

FIG. 1 is a schematic diagram showing a stainless steel slab containing B. The term "stainless steel bloom" in the present invention designates either continuous cast slab, hot forging slab, blooming slab, or cast ingot (steel ingot), which is used as a base metal in FIG. 1. Generally, the bloom is in a rectangular solid form and is subjected to hot working such as hot rolling or forging so as to be elongated in longitudinal direction.

The phrase "at least two faces across the bloom from each other, excluding a working plane" is defined to be two faces opposing each other across the bloom among surfaces excluding working planes subjected to rolling, forging or the like. For instance, in rolling, it means two longitudinal side end faces, or may include the case which consists of top and tail end face also. In forging, it means two side end faces opposing each other that do not contact with a ram, or the case which may include three or four faces further. Also, in case chamfering is carried out for removing the corners, it may include the chamfered faces also.

"A thickness of a protecting material"0 is meant to a thickness in transverse direction of a protecting material in the plane parallel to a working plane before being bonded to a base metal. For a steel slab after bonding, a total thickness of a bare protecting material and a resultant weld metal within the protecting material is primarily referred.

"Weld metal" is defined to as one part of a bonded layer, and to as a metal portion where a base metal along with a protecting material prior to bonding is fused and solidified in bonding process, excluding a heat affected zone (HAZ) which simply causes solid phase transformation.

"An insert material" is meant to a material inserted or interposed between a stainless steel bloom (base metal) and a protecting material, which is, to be concrete, exemplified by a plate type, a metal foil type, a powder layer or the like.

DESCRIPTION OF THE PREFERRED EMBODIMENTS

Figure 1:
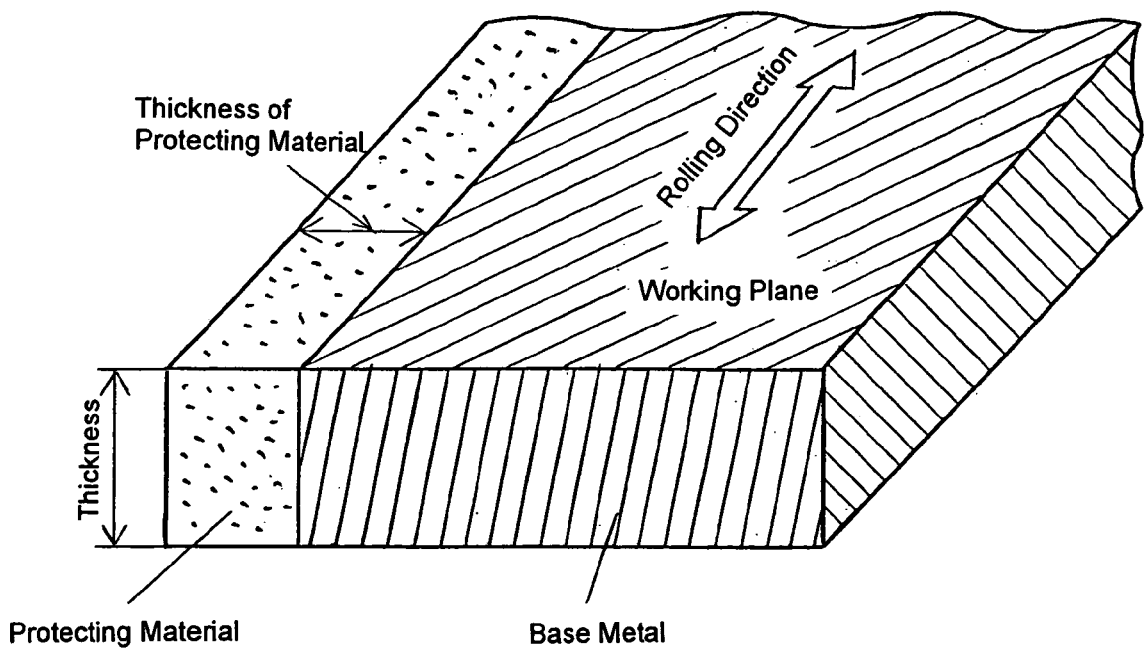
FIG. 1 is a schematic diagram showing a stainless steel slab containing B.
Figure 2:
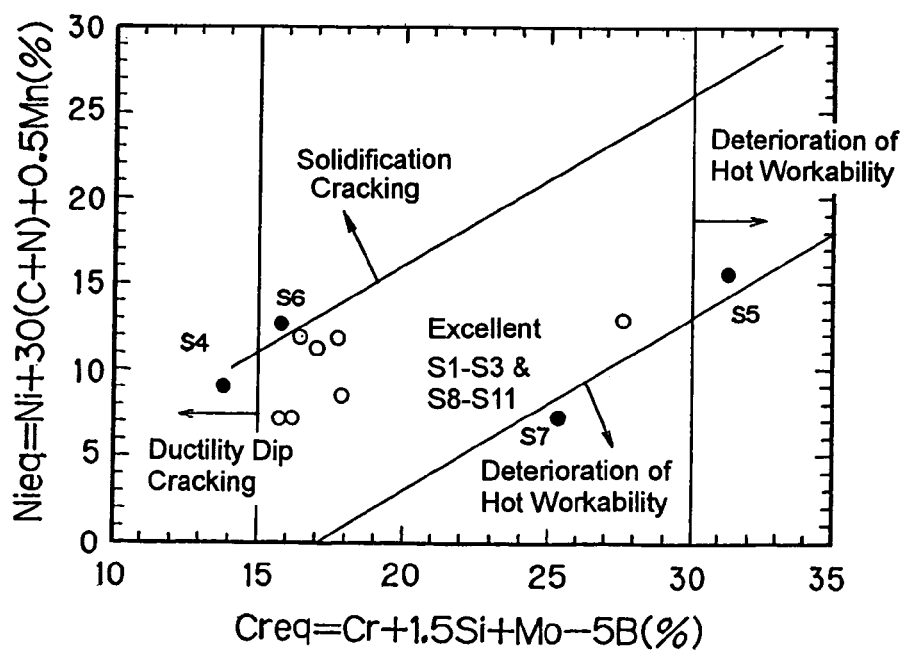
FIG. 2 is a diagram showing the relationship between chemical composition of weld metal and weld cracking along with rolling deformability.

The present inventors investigated the method for production of a steel product, wherein a protecting material having a predetermined thickness is bonded onto side end faces of a steel bloom, and rolling etc. can be subsequently applied as an economical method rather than the method to build up a protecting layer by overlay welding onto side end faces of a workpiece material.

Electron beam welding method is applied for bonding of a protecting material. Table 1 shows each chemical composition of steel blooms as base metals and protecting materials in whole.

caused. Therefore, it is preferable to be 0.08% or less in C content. It is much more preferable that C content is 0.01% or more.

Si: 1% or less

Si is used as a deoxidizing element, while having an effect to enhance the oxidation resistance. However, when Si content exceeds 1%, the sensitivity to weld cracking gets higher. Thus, it is preferable that Si content is specified to be 1% or less.

P: 0.04% or less

P is an impurity contained in steel, and the sensitivity to weld cracking gets higher, when the content is above 0.04%. Thus, it is preferable that P content is specified to be 0.04% or less.

S: 0.01% or less

S is an impurity contained in steel, and the sensitivity to weld cracking gets higher, when the content is above 0.01%. Thus, it is preferable that S content is specified to be 0.01% or less.

TABLE 1

| | Steel No. | Chemical Composition (mass %, Balance of Fe and Impurities) | | | | | | | | | | |
|---|---|---|---|---|---|---|---|---|---|---|---|---|
| | | C | Si | Mn | P | S | Cu | Cr | Mo | Al | Ni | N | B |
| Base Metal | M1 | 0.027 | 0.03 | 0.94 | 0.031 | 0.002 | — | 19.64 | 0.62 | 0.09 | 9.47 | 0.04 | 1.17 |
| | M2 | 0.013 | 0.05 | 0.54 | 0.022 | 0.001 | — | 23.80 | 2.30 | 0.08 | 9.25 | 0.03 | 0.62 |
| | M3 | 0.029 | 0.28 | 2.33 | 0.025 | 0.001 | 0.18 | 17.54 | 0.01 | 0.02 | 10.10 | 0.02 | 0.84 |
| | M4 | 0.020 | 0.21 | 0.73 | 0.015 | 0.001 | — | 19.25 | 1.23 | — | 10.25 | 0.04 | 0.64 |
| | M5 | 0.035 | 0.22 | 1.25 | 0.033 | 0.001 | — | 26.87 | 2.84 | 0.06 | 8.74 | 0.04 | 0.42 |
| Protecting Material | P1 | 0.024 | 0.35 | 1.23 | 0.031 | 0.002 | — | 18.25 | 0.01 | 0.03 | 8.53 | 0.03 | — |
| | P2 | 0.025 | 0.69 | 0.67 | 0.024 | 0.001 | — | 17.52 | 0.01 | 0.03 | 0.58 | 0.02 | 0.25 |
| | P3 | 0.028 | 0.25 | 0.68 | 0.022 | 0.001 | — | 16.32 | 0.58 | 0.07 | 0.24 | 0.03 | — |
| | P4 | 0.035 | 0.35 | 1.32 | 0.028 | 0.001 | — | 13.25 | 0.01 | 0.03 | 3.57 | 0.02 | — |
| | P5 | 0.032 | 0.86 | 0.98 | 0.016 | 0.001 | — | 29.53 | 3.50 | 0.05 | 16.75 | 0.03 | — |
| | P6 | 0.014 | 0.48 | 0.75 | 0.027 | 0.001 | — | 16.53 | 0.01 | 0.08 | 11.85 | 0.02 | — |
| | P7 | 0.036 | 0.93 | 0.84 | 0.036 | 0.002 | — | 25.53 | 1.38 | 0.03 | 1.25 | 0.03 | — |
| | P8 | 0.025 | 0.38 | 0.74 | 0.031 | 0.002 | — | 26.57 | 0.01 | 0.03 | 12.57 | 0.02 | — |
| | P9 | 0.021 | 0.47 | 0.76 | 0.037 | 0.001 | — | 20.51 | 0.01 | 0.03 | 3.87 | 0.01 | — |

1) Chemical Composition of Stainless Steel Blooms as Base Metals:

B: 0.3–2.5%

When B content of a stainless steel bloom containing B as a material to be hot worked is less than 0.3%, neither the thermal neutron absorption ability nor the improvement of electric resistance characteristic in need for a separator of fuel cell is sufficient. Therefore, B content is specified to be 0.3% or more. As B content increases, the thermal neutron absorption ability and electric resistance characteristic get improved, but, when it exceeds 2.5%, the deterioration of ductility and toughness at ambient temperature is markedly discerned. Thus, B content is specified to be 2.5% or less.

As a base metal, either an austenitic stainless steel or a ferritic stainless steel can be used, but so as to be used as a function-related material, especially as a separator of fuel cell, it is limited to an austenitic stainless steel.

Preferable Range of Other Chemical Elements:

The preferable range of chemical elements other than B in a stainless steel containing B according to the present invention is described as below.

C: 0.08% or less

C is an element having an effect to secure the strength. However, when C is contained in more than 0.08%, the deterioration of corrosion resistance and hot workability is Cr: 5% or more Cr is an element having an effect to enhance corrosion resistance, wherein, when the content is 5% or more, a desirable effect is obtained. Thus, it is preferable that Cr content is specified to be 5% or more. Meanwhile, in case that Cr content exceeds 30%, hot working could become harder, so it is preferable that Cr content is specified to be 30% or less.

N: 0.05% or less

N tends to combine with B, resulting in deterioration of toughness. It is preferable that N content is specified to be 0.05% or less in securing adequate toughness.

Mo: 5% or less, Cu: 0.5% or less, and Al: 0.3% or less

These elements further enhance corrosion resistance, when included within the specified range as above if need be. Therefore, when further enhancement of corrosion resistance is required, it is preferable that any element independently or in combination with others within the specified range as above is included further.

2) Chemical Composition of Weld Metal:

The chemical composition of weld metal, which constitutes the bonding layer of a protecting material and a base metal, is recited in the followings. In bonding a protecting material with high-efficiency by employing electron beam welding method etc. it is essential to avoid the generation of cracking during bonding and to avoid the generation of cracking in a protecting material during hot rolling process. Meanwhile, cracking during bonding (welding) is classified into solidification cracking and ductility dip cracking. To prevent the generation of either cracking as above, it is necessary for chemical composition of weld metal constituting the bonding layer of a protecting material and a base metal to satisfy the relationship expressed by (1)–(4) formulas as below.

$$15 \leq Cr\ eq \leq 30 \quad (1)$$

$$4 \leq Cr\ eq - Ni\ eq \leq 17 \quad (2)$$

where, $$Cr\ eq = Cr + 1.5 \times Si + Mo - 5 \times B \quad (3)$$

$$Ni\ eq = Ni + 30 \times (C+N) + 0.5 \times Mn \quad (4)$$

The reason is explained in detail as below.

When the value of Cr eq in above is less than 15, a weld metal containing B due to the dilution with a stainless steel containing B is formed in deficiency of ductility, which may yields to a ductility dip cracking in case that a high thermal stress is aroused in electron beam welding etc. The lack of ductility is attributed to partial martensitic phase transformation, lacking in ductility, of an austenitic phase which became unstable in association with formation of boronizing compound.

However, when the value of Cr eq is secured to be 15 or more, an austenitic phase gets stable, thus enabling to suppress the formation of martensitic structure and to avoid the state of lack of ductility.

Meanwhile, when the value of Cr eq exceeds 30, the hot workability of weld metal deteriorates, leading to cracking during hot rolling process. Therefore, the value of Cr eq must satisfy the relationship expressed by above formula (1).

Further, it is not adequate enough for the value of Cr eq to satisfy the formula (1) solely in order to avoid cracking during welding and to prevent the generation of cracking during hot rolling process, thus it becomes essential for the value of (Cr eq–Ni eq) to be adjusted within a proper range. When the value of (Cr eq–Ni eq) is less than 4, weld solidification cracking generates, while, when the value of (Cr eq–Ni eq) exceeds 17, cracking during hot rolling process generates.

Weld solidification cracking is attributed to the synergy effect by the formation of low melting point metal phase due to B and a thermal stress specific to electron beam welding etc. By controlling that the value of (Cr eq–Ni eq) is to be 4 or more, a ferrite phase can be detained up until the end period of solidification and disperse low melting point metal phase, thus enabling to avoid solidification cracking even under a high thermal stress owing to electron beam welding etc. Therefore, it is necessary for the value of (Cr eq–Ni eq) to satisfy the relationship expressed by above formula (2).

By the reason described as above, it is essential to adjust the chemical composition of weld metal within the proper range to be determined by (1)–(4) formulas in order to avoid weld cracking in case of performing high-efficiency welding for a protecting material, and to prevent the generation of cracking of weld metal during hot rolling process.

Preferable Range of Other Chemical Elements:

The preferable range of other chemical elements for weld metal is described as below.

C: 0.08% or less

C is an element having an effect to secure the strength that suppress the deformation during heating a steel bloom. However, when C is contained in more than 0.08%, the deterioration of hot workability is caused. Therefore, it is preferable to be 0.08% or less in C content. It is much more preferable that C content is controlled to be 0.01% or more.

Si: 1% or less

Si is used as a deoxidizing element, while having an effect to enhance the oxidation resistance. However, when Si content exceeds 1%, the sensitivity to weld cracking gets higher. Thus, it is preferable that Si content is specified to be 1% or less.

P: 0.04% or less

P is an impurity contained in steel, and the sensitivity to weld cracking gets higher, when the content is above 0.04%. Thus, it is preferable that P content is specified to be 0.04% or less.

S: 0.01% or less

S is an impurity contained in steel, and the sensitivity to weld cracking gets higher, when the content is above 0.01%. Thus, it is preferable that S content is specified to be 0.01% or less.

Cr: 5% or more

Cr is an element having an effect to enhance corrosion resistance, wherein, when the content is 5% or more, a desirable effect is obtained. Thus, it is preferable that Cr content is specified to be 5% or more. Meanwhile, in case that Cr content exceeds 30%, hot working could be hard, so it is preferable that Cr content is specified to be 30% or less.

3) Chemical Composition of Stainless Steels for Protecting Materials:

B: 0.3% or less

When a protecting material should contain B more than 0.3%, cracks may generate in a protecting material itself at side edge portions where the tension in rolling is large, thus making it impossible for a protecting material to act as a protector. Therefore, B content is specified to be 0.3% or less.

Since the chemical composition of weld metal that is formed by being fused and mixed with a base metal must satisfies the relationships expressed by (1)–(4) formulas as afore-mentioned, other elements such as Cr, Ni, etc. are substantially limited by chemical composition of weld metal.

The chemical composition of weld metal formed in case of bonding by electron beam welding method becomes close to an arithmetic mean of chemical composition of a base metal and that of a protecting material. Therefore, when the chemical composition of a base metal to be used is determined, the range of Ni, Cr and the like other than B for a protecting material can be obtained by using formulas (1)–(4) as afore-mentioned.

Preferable Range of Other Chemical Elements:

The preferable range of other chemical elements for a protecting steel material, in addition to the range which is obtained as above, is set forth as below.

C: 0.08% or less

C is an element having an effect to secure the strength that suppress the deformation during heating a steel bloom. However, when C is contained in more than 0.08%, the deterioration of hot workability is caused. Therefore, it is preferable to be 0.08% or less in C content. It is much more preferable that C content is controlled to be 0.01% or more.

Si: 1% or less

Si is used as a deoxidizing element, while having an effect to enhance the oxidation resistance. However, when Si content exceeds 1%, the sensitivity to weld cracking gets higher. Thus, it is preferable that Si content is specified to be 1% or less.

P: 0.04% or less

P is an impurity contained in steel, and the sensitivity to weld cracking gets higher, when the content is above 0.04%. Thus, it is preferable that P content is specified to be 0.04% or less.

S: 0.01% or less

S is an impurity contained in steel, and the sensitivity to weld cracking gets higher, when the content is above 0.01%. Thus, it is preferable that S content is specified to be 0.01% or less.

Cr: 5% or more

Cr is an element having an effect to enhance corrosion resistance, wherein, when the content is 5% or more, a desirable effect is obtained. Thus, it is preferable that Cr content is specified to be 5% or more. Meanwhile, in case that Cr content exceeds 30%, hot working could become harder, so it is preferable that Cr content is specified to be 30% or less.

4) Need of Insert Materials and Chemical Composition Thereof:

When welding is performed with combination of a stainless steel bloom containing low B, for instance, 0.3–0.7%, and a protecting material containing nil B, the crack sensitivity of weld metal gets higher, as afore-mentioned, and weld cracking are likely to generate.

This is because, in weld metal which is formed in case that a stainless steel base metal has low B content and thus B content of formed weld metal gets diluted by a protecting material, a boronizing compound is unlikely to be formed from the liquid phase, thus likely making the annihilation of low melting point metal phase to delay. Consequently, the crack sensitivity of weld metal gets higher and the weld cracking likely generates when welding is performed with much higher efficiency.

On the other hand, when B content of a protecting material is increased, B content of weld metal gets higher, which leads up to the deterioration of hot workability all the worse, thus making it impossible for a protecting material to play an intended role as expected. Hence, it is preferable that an insert material containing B is disposed or interposed between a stainless steel bloom and a protecting material to be bonded together. In this regard, it is preferable that the B content as well as other elements are within the range set forth as below.

B: 0.4–2.5%

When B content of an insert material is less than 0.4%, neither the thermal neutron absorption ability nor the improvement of electric resistance characteristic required for a separator of a fuel cell is sufficient when further taking into account the dilution during welding. Thus, B content is specified to be 0.4% or more. Meanwhile, when it exceeds 2.5%, the deterioration of ductility and toughness at ambient temperature is markedly augmented. Thus, B content is specified to be 2.5% or less.

Preferable Range of Other Chemical Elements:

The preferable range of chemical elements other than B in an insert material by the present invention is described as below.

C: 0.08% or less

C is an element having an effect to secure the strength. However, when C is contained in more than 0.08%, the deterioration of corrosion resistance and hot workability is caused. Therefore, it is preferable to be 0.08% or less in C content. It is much more preferable that C content is controlled to be 0.01% or more.

Si: 1% or less

Si is used as a deoxidizing element, while having an effect to enhance the oxidation resistance. However, when Si content exceeds 1%, the sensitivity to weld cracking gets higher. Thus, it is preferable that Si content is specified to be 1% or less.

P: 0.04% or less

P is an impurity contained in steel, and the sensitivity to weld cracking gets higher, when the content is above 0.04%. Thus, it is preferable that P content is specified to be 0.04% or less.

S: 0.01% or less

S is an impurity contained in steel, and the sensitivity to weld cracking gets higher, when the content is above 0.01%. Thus, it is preferable that S content is specified to be 0.01% or less.

Cr: 5% or more

Cr is an element having an effect to enhance corrosion resistance, wherein, when the content is 5% or more, a desirable effect is obtained. Thus, it is preferable that Cr content is specified to be 5% or more. Meanwhile, in case that Cr content exceeds 30%, hot working could become harder, so it is preferable that Cr content is specified to be 30% or less.

5) Preferable Condition of Electron Beam Welding:

When a protecting material made of a stainless steel, having a 10 mm or more of thickness in plane parallel to a working plane, is welded onto side end faces of a steel bloom (heavy wall slab) having a cross sectional thickness of 80 mm or more, an optimal condition for welding whole side end face in thickness direction without misalignment from bonding surface is found as below.

(1) Welding Current: 300 mA or more
(2) Welding Speed: 200 mm/min or less
(3) Scanning Amplitude of Electron Beam: ±1.0–±3.0 mm Under above conditions in (1–(3), welding is performed from both working planes (for instance, top and bottom surfaces of the bloom) at butted faces to be bonded in a steel bloom and a protecting material from both directions. In the followings, test results that lead up to above findings are recited.

[Test A]

A test was carried out to investigate a preferable welding condition by welding a protecting material onto side end faces of a stainless steel bloom containing B in 90 mm thickness, while changing the condition of electron beam welding as shown below in (a)–(c);

(a) Welding current: 200–400 mA,
(b) Welding speed: 100–300 mm/min.
(c) Scanning amplitude of electron beam: ±0.5–±4.0 mm.

As base metals, stainless steels containing B designated by Steel Nos. M1 and M2 in Table 1 were selected, and protecting materials designated by Steel Nos. P1 and P2 in Table 1 were used. Test results are shown in FIGS. 3 and 4.

Figure 3:
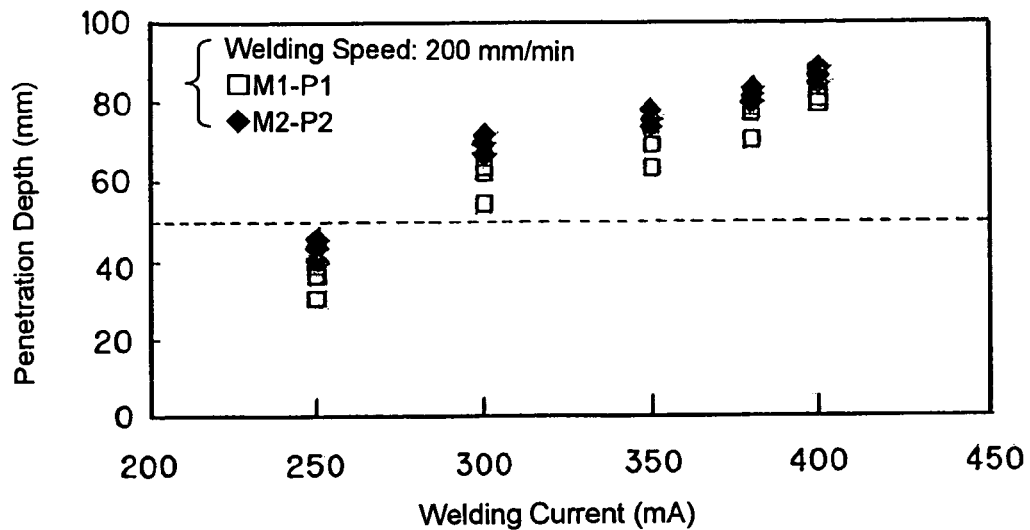
FIG. 3 is a diagram showing the relationship between a welding current and a penetration depth.

FIG. 3 is a diagram showing the relationship between a welding current and a penetration depth, which is obtained when a welding speed is set to be 200 mm/min. And FIG. 4 is a diagram showing the relationship between a welding speed and a penetration depth, which is obtained when a welding current is set to be 300 mA.

It turned out from the result in FIG. 3 that, as far as a welding current is 300 mA or more, a sufficient penetration depth of 50 mm or more can be secured, enabling high-efficiency electron beam welding to be performed.

Figure 4:
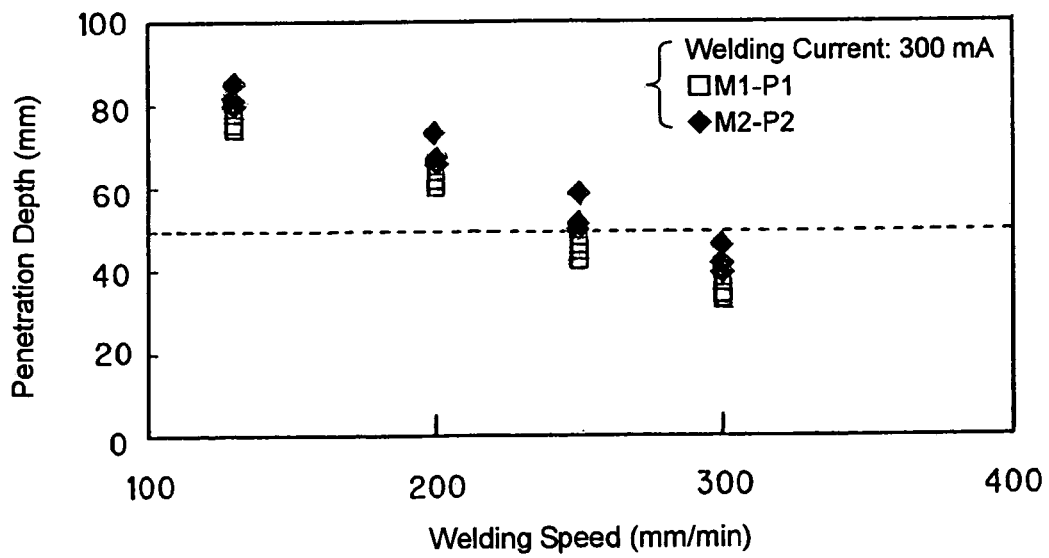
FIG. 4 is a diagram showing the relationship between a welding speed and a penetration depth.

It turned out to be clear from the result in FIG. 4 that, as far as a welding speed is 200 mm or less, a sufficient penetration depth of 50 mm or more can be obtained, enabling high efficient electron beam welding to be performed.

From these results, it became evident that a sufficient penetration depth can be obtained, enabling high efficient electron beam welding to be performed, as far as both a welding current: 300 mA or more and a welding speed: 200 mm/min or less are simultaneously satisfied.

With regard to a scanning amplitude of electron beam, when it is less than ±1.0 mm, a bead width gets narrow, which amounts to increase man-hours for positioning of bonding faces. Meanwhile, when it exceeds ±3 mm, the bead width gets widen, which amounts to inhomogeneous or unstable weld-solidification metal structure. Accordingly, it is preferable that a scanning amplitude of electron beam is set forth within the range of ±1.0–±3.0 mm.

6) Thickness of Protecting Materials:

In order to prevent edge cracking, it is preferable that a thickness of a protecting material is 10 mm or more. As the thickness increases, the effect to suppress the generation of edge cracking is enhanced in general, but the excessive increase of the thickness adversely affects the yield of a protecting material, which is not favorable. Thus, it is preferable that a thickness of a protecting material is set to be 50 mm or less. In the followings, details are shown.

[Test B]

In order to carry out valuation on edge cracking, experimental tests were performed by using base metals as well as protecting materials that meet the specified chemical composition range by the present invention.

As a workpiece material to be rolled, a bloom of 200 mm wide×50 mm thick×100 mm long in dimension comprising a stainless steel containing B designated as Steel No. M1 in Table 1 was prepared, and a protecting material comprising an austenitic stainless steel (TP304L) designated as Steel No. P1 in Table 1 was welded onto side end faces of said bloom by applying above electron beam welding method, which is referred to as a test block in the end.

The applied condition of electron beam welding comprised a welding current: 350 mA, a welding speed: 130 mm/min, and a scanning amplitude of electron beam: ±2 mm.

In applying an electron beam welding under above condition, a layer measuring about 5 mm thick is fused in both a base metal of an austenitic stainless steel containing B and a protecting material of TP304L respectively, thus the weld metal portion having a fusion zone of about 10 mm thick in all is normally generated.

After an electron beam welding, a protecting material was ground off, and a thickness in the plane parallel to a working plane, in transverse direction from side end face of a prior base metal block before welding (a bare thickness of a protecting material, excluding weld metal portion), is adjusted within the range of 0–10 mm.

The test block thus constructed was heated at 1180° C. for one hour or more, and was subjected to hot rolling with finishing temperature of 600–700° C. So as to secure a finishing thickness of a sheet to be 1.0 mm, and to secure a total reduction ratio initial thickness/finishing thickness (–)) to be 50.0, a hot rolling process in multiple passes was applied by using 2 high mill consisted of work rolls with 350 mm in diameter.

The above value as a total reduction ratio was adopted to be equivalent or more than that in a commercial operation. This is because a lower total reduction ratio generally helps mitigating the generation of edge cracking, hence ruining proper evaluation on prevention of edge cracking, which had been intended by experimental tests in simulating a commercial operation.

Since an upper limit of a total reduction ratio in a commercial operation is practically considered to be 50.0, this experimental test should correctly represent the evaluation on edge cracking in a commercial operation. Table 2 shows the evaluation results on edge cracking.

TABLE 2

| Test No. | Steel No. Base Metal | Steel No. Protecting Material | Dimension of Test Sample Thickness (mm) | Dimension of Test Sample Width (mm) | Finishing Thickness (mm) | Total Reduction (–) | Position of Protecting Material | Bare Thickness of Protecting Material (*1) (mm) | Weld Metal Thickness in Protecting Material (*2) (mm) | Thickness of Protecting Material (*3) (mm) | Test Results Edge Cracking | Evaluation |
|---|---|---|---|---|---|---|---|---|---|---|---|---|
| A1 | M1 | P1 | 50 | 200 | 1.0 | 50 | DS | 0 | 5 | 5 | Cracking | X |
|  |  |  |  |  |  |  | WS | 1 | 5 | 6 | No Crack | O |
| A2 | M1 | P1 | 50 | 200 | 1.0 | 50 | DS | 3 | 5 | 8 | No Crack | O |
|  |  |  |  |  |  |  | WS | 5 | 5 | 10 | No Crack | O |
| A3 | M1 | P1 | 50 | 200 | 1.0 | 50 | DS | 7 | 5 | 12 | No Crack | O |
|  |  |  |  |  |  |  | WS | 10 | 5 | 15 | No Crack | O |

(Note)
DS: Motor side of rolling mill,
WS: Opposite side to motor
*1: indicates a thickness of a protecting material which was not fused even by welding,
*2: indicates a thickness in a protecting material which was fused by welding,
*3: indicates a total amount of Bare Thickness of Protecting Material and Weld Metal Thickness in Protecting Material, which was converted as Thickness of Protecting Material prior to welding.

In Table 2, Bare Thickness of Protecting Material indicates of a protecting material which was not fused even by welding, and Weld Metal Thickness in Protecting Material indicates a thickness of part of a protecting material which was fused by welding. Also, Thickness of Protecting Material indicates a total amount of Bare Thickness of Protecting Material and Weld Metal Thickness in Protecting Material, which was converted as Thickness of Protecting Material prior to welding.

The evaluation on edge cracking was based on visual inspection for side edge portions over whole length after rolling, wherein, when the length of a crack indication is less than 0.1 mm, it is evaluated as "No Crack" indicated by symbol O, while the case when the length of a crack indication is not less than 0.1 mm is judged as "Cracking" indicated by symbol X.

From the result in Table 2, it is obviously recognized that, even if the finishing temperature is as low as 600–700° C. in hot rolling, edge cracking can be thoroughly prevented, as far as a thickness of a protecting material after electron beam welding which is not fused, namely, a bare thickness of a protecting material is secured to be 1 mm or more, in another word, a thickness of a protecting material prior to welding is secured to be 6 mm or more.

This test result was acquired by using a test rolling mill that is simulated to a commercial rolling mill on a reduced scale of ½ through ⅕. Thus, based on this test result, it is necessary to estimate a required thickness of a protecting material for prevention of edge cracking in commercial operations.

[Preferable Thickness of Protecting Materials in Commercial Operations]

Edge cracking is generated due to incurred tension stress at side edge portions during deformation in rolling. In this regard, a distribution of tension within in-process steel plate during deformation in rolling was investigated.

Figure 5:
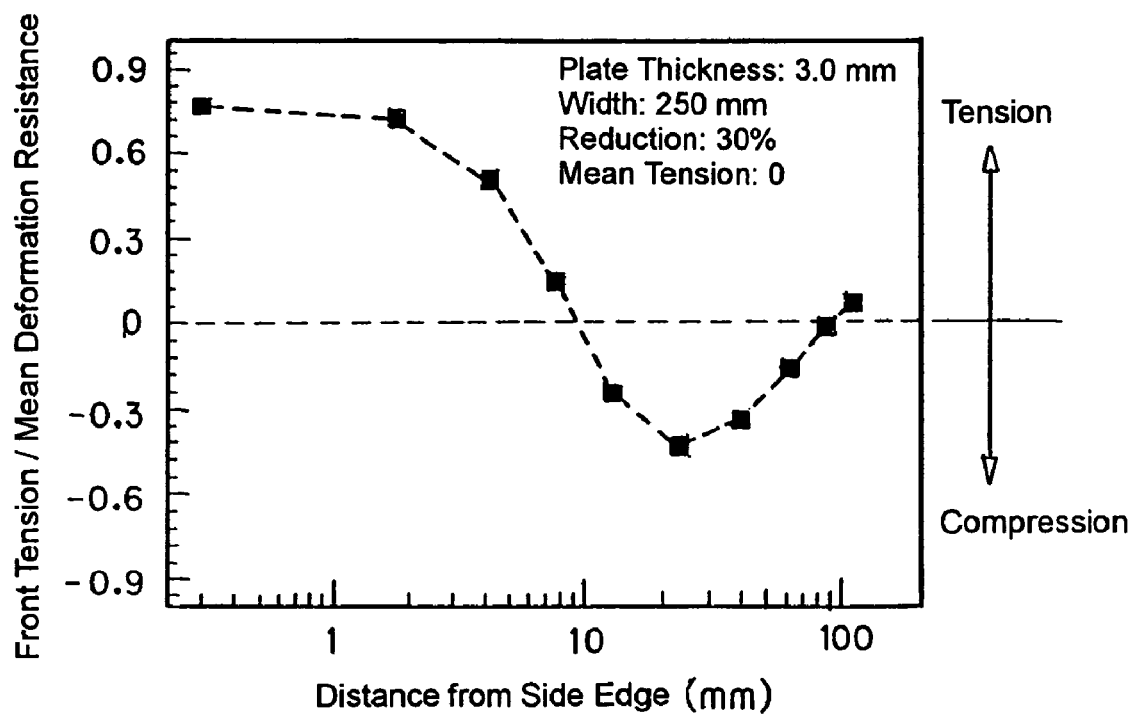
FIG. 5 is a diagram showing an analysis result by finite element method on distribution of longitudinal tension across the plate width during rolling of steel plate.

FIG. 5 is a diagram showing an analysis result by finite element method (FEM) on a distribution of longitudinal tension across the plate width during rolling of steel plate. Here, the analysis was executed under the condition as below, applying three (3) dimensional rigid-plastic finite element method.

(a) Diameter of work roll in rolling mill: 200 mm,
(b) Dimension of steel plate: 3.0 mm thick, 250 mm wide,
(c) Reduction: 30%

According to the result in FIG. 5, it is observed that a tension is exerted around the region ranging from side edges to about 10 mm away inwardly therefrom and an edge tension gets maximum in the neighborhood of side edges. Thus, it turns out that, by putting a material having superior deformability into the region where said edge tension is exerted, it makes it possible to prevent the generation of edge cracking.

According to the analysis results by the present inventors on edge tension under various conditions, it was found that a distance $\delta Wc$ from a side edge as far as this tension exists has a proportional relationship as expressed by formula (5) below;

$$\delta Wc = K \times R^{0.5} \times h \qquad (5)$$

where R denotes a radius of a work roll, h denotes a thickness, and K denotes a proportional constant respectively.

Therefore, a required thickness L of a protecting material for prevention of edge cracking in commercial operations can be obtained by formula (6) below, defined by R: a radius of a work roll in a commercial rolling mill, h: a finishing thickness, R0: a radius of a test rolling mill, h0: a finishing thickness in test rolling mill, and L0: a bare thickness of a protecting material in test rolling mill respectively, $$L \geq L0 \times (R^{0.5} \times h)/(R0^{0.5} \times h0) \qquad (6)$$

As afore-mentioned, in a test by using a test rolling mill, it is necessary to apply a total reduction ratio equivalent or more than that in a commercial operation. Thus, when a total reduction ratio is denoted by C, above formula (6) can be replaced with formula (7) below, $$L \geq L0 \times (R/R0)^{0.5} \times \{(H/C)/(H0/C)\} \qquad (7)$$
$$= L0 \times (R/R0)^{0.5} \times (H/H0)$$

where H denotes an initial thickness in a commercial rolling, while H0 denotes an initial thickness in test rolling.

In above formula (7), given by L0=1.0 mm, R0=175 mm, H0=50 mm on the basis of the test results shown in above Table 2 that was acquired in experimental tests, the formula (8) below can be obtained.

$$L(\text{mm}) \geq 1.0 \times (R/175)^{0.5} \times (H/50) \qquad (8)$$

In a heavy plate rolling mill where a work roll with a large radius is set in a commercial rolling mill, it is common that a radius of a work roll is 500 mm, and a thickness of a stainless steel slab containing B is 150 mm, which are substituted in above formula (8) to obtain formula (9) below, $$L(\text{mm}) \geq 1.0 \times (500/175)^{0.5} \times (150/50) \qquad (9)$$
$$\approx 5 \text{ mm}$$

The result, shown in formula (9), as well as the acquired data in Test B that the region equivalent to a thickness of 5 mm within a protecting material turns to weld metal in electron beam welding, make it evident that edge cracking in commercial operations can be prevented as long as a thickness of protecting material is secured to be 10 mm or more.

7) Hot Working and Cold Working:

Hot working generically represents blooming and forging, heavy plate rolling, and hot strip rolling. It is preferable that the heating temperature for the workpiece material is set as high as possible unless any embrittlement by partial melting at grain boundaries takes place. In case of a stainless steel containing B, it is preferable to select a range from 1100 to 1200° C. as for heating temperature.

With regard to the finishing temperature in hot forging or hot rolling, it is preferable to apply a higher temperature from the view point of preventing edge cracking. However, as far as the hot deformability of a protecting material can tolerate, it is also possible to apply a low finishing temperature such as 600–700° C.

Further, when a stainless steel containing B is adopted for a separator of fuel cell, cold strip rolling as a cold working process will be applied for finishing as a cold strip, which is subsequently subjected to press forming for a predetermined cross-sectional configuration.

A stainless steel product containing B thus obtained as above, which proves to be highly reliable and to be made with high productivity, is well suited for neutron shielding container, and further for the source material to be applied for function-related usage such as a separator of fuel cell or so.

EXAMPLE 1

In Example 1, experimental tests were performed using base metals as well as protecting materials, which conforming to the chemical composition of the steel specified by the present invention.

A test block to be used as a material to be rolled was constructed by combining a protecting material made of either stainless steel among Steel Nos. P1–P9 in Table 1 into a side end face of each steel bloom with a dimension of 200 mm wide×50 mm thick×100 mm long, which is made of either austenitic stainless steel containing B among Steel Nos. M1–M5 in Table 1, and by subsequently performing afore-mentioned electron beam welding.

In Table 3, each chemical composition of resultant weld metals in each test block with combination of various base metals and protecting materials is shown along with each evaluation result.

After electron beam welding, a protecting material was ground off in such a way that a bare thickness of a protecting material (a thickness of a protecting material, excluding weld metal), meaning a thickness in traverse direction from a side edge of base metal in the plane parallel to the working plane, be adjusted to be 1 mm.

The test block thus made was heated by reheating furnace to 1180° C. for one hour or more and was subsequently subjected to hot rolling process with finishing temperature of 600–700° C. The hot rolling process with a multiple pass using 2 high mill having a 350 mm diameter of work rolls was applied so as to secure a finishing thickness of 1 mm and a total reduction ratio (initial thickness/finishing thickness (−)) of 50.0.

The above value as a total reduction ratio was adopted to be equivalent or more than that in a commercial operation. This is, as afore-mentioned, because a lower total reduction ratio helps mitigating the generation of edge cracking, thus

TABLE 3

| Test No. | Steel No. Base Metal | Steel No. Protecting Material | Chemical Composition (mass %, Balance of Fe and Impurities) | | | | | | | |
|---|---|---|---|---|---|---|---|---|---|---|
| | | | C | Si | Mn | P | S | Cu | Cr | Mo |
| S1 | M1 | P1 | 0.025 | 0.19 | 1.10 | 0.031 | 0.002 | — | 19.29 | 0.31 |
| S2 | M1 | P2 | 0.027 | 0.37 | 0.83 | 0.028 | 0.002 | — | 18.84 | 0.31 |
| S3 | M1 | P3 | 0.027 | 0.14 | 0.83 | 0.027 | 0.002 | — | 17.85 | 0.59 |
| S4 | M1 | P4 | 0.031 | 0.19 | 1.13 | 0.030 | 0.001 | — | 16.15 | 0.32 |
| S5 | M5 | P5 | 0.034 | 0.54 | 1.13 | 0.024 | 0.001 | — | 28.47 | 3.10 |
| S6 | M1 | P6 | 0.021 | 0.25 | 0.85 | 0.029 | 0.002 | — | 18.03 | 0.31 |
| S7 | M2 | P7 | 0.025 | 0.49 | 0.68 | 0.029 | 0.002 | — | 24.42 | 1.80 |
| S8 | M1 | P8 | 0.029 | 0.30 | 0.99 | 0.032 | 0.001 | — | 26.76 | 1.41 |
| S9 | M1 | P9 | 0.024 | 0.25 | 0.83 | 0.033 | 0.001 | — | 20.10 | 0.32 |
| S10 | M3 | P1 | 0.026 | 0.31 | 1.74 | 0.028 | 0.002 | 0.09 | 18.03 | 0.01 |
| S11 | M4 | P1 | 0.022 | 0.29 | 0.99 | 0.023 | 0.002 | — | 18.31 | 0.63 |

| Test No. | Chemical Composition (mass %, Balance of Fe and Impurities) | | | | Cr eq | Ni eq | Cr eq − Ni eq | Evaluation Weld Cracking | Evaluation Cracking During Rolling |
|---|---|---|---|---|---|---|---|---|---|
| | Al | Ni | N | B | | | | | |
| S1 | 0.059 | 8.90 | 0.03 | 0.577 | 17.00 | 11.20 | 5.81 | O | O |
| S2 | 0.060 | 5.04 | 0.03 | 0.710 | 16.16 | 7.07 | 9.09 | O | O |
| S3 | 0.077 | 4.88 | 0.03 | 0.592 | 15.70 | 7.06 | 8.64 | O | O |
| S4 | 0.058 | 6.60 | 0.03 | 0.598 | 13.76 | 8.93 | 4.83 | X | — |
| S5 | 0.055 | 12.83 | 0.04 | 0.215 | 31.29 | 15.47 | 15.83 | O | X |
| S6 | 0.082 | 10.72 | 0.03 | 0.593 | 15.76 | 12.60 | 3.16 | X | — |
| S7 | 0.056 | 5.19 | 0.03 | 0.317 | 25.36 | 7.20 | 18.16 | O | X |
| S8 | 0.046 | 10.57 | 0.03 | 0.206 | 27.60 | 12.84 | 14.76 | O | O |
| S9 | 0.058 | 6.62 | 0.02 | 0.588 | 17.85 | 8.42 | 9.43 | O | O |
| S10 | 0.025 | 9.43 | 0.03 | 0.418 | 16.42 | 11.86 | 4.56 | O | O |
| S11 | — | 9.61 | 0.03 | 0.326 | 17.73 | 11.80 | 5.93 | O | O |

(Note)
Evaluation Criteria:
O: indicating good, free of cracking
X: indicating generation of cracks
—: indicating that hot rolling was abandoned due to weld cracking in test block The condition of electron beam welding comprised a welding current: 350 mA, a welding speed: 130 mm/min, and a scanning amplitude of an electron beam: ±2 mm.

By electron beam welding under above condition, a layer of about 5 mm each in a base metal, made of an austenitic stainless steel containing B, and a protecting material made of a stainless steel is fused, resulting in forming weld metal of about 10 mm thick in all. The chemical composition shown in Table 3 indicates that of this weld metal.

ruining a proper evaluation on prevention of edge cracking, which had been intended by experimental tests in simulating a commercial operation.

In Table 3, an inspection result by ultrasonic examination on the presence of weld cracking and an evaluation result on edge cracking subsequent to hot rolling are shown. The evaluation on edge cracking was based on visual inspection for side edge portions over whole length after rolling, wherein, when the length of a crack indication is less than 0.1 mm, it is evaluated as "No Crack" indicated by symbol O, while the case when the length of a crack indication is not less than 0.1 mm is judged as "Cracking" indicated by symbol X.

It turned out from the result shown in this Table that, in test campaigns designated by Test Nos. S1–S3 and also by Test Nos. S8–S11 which satisfy the relationship expressed by formulas (1)–(4) according to the present invention, neither weld cracking was generated, nor edge cracking was observed after hot rolling, finally ending up to satisfactory consequences.

Meanwhile, in test campaigns designated by Test Nos. S4 and S6, weld cracking was already detected prior to hot rolling. In Test No. S4, the value derived from formula (1) was less than 15, and ductility dip cracking was generated, while the value derived from formula (2) was less than 4 in Test No. S6, and solidification cracking was generated. In each case, the specified requirement according to the present invention had not been met, thus ending up to generating cracks in weld metals.

In Test Nos. S5 and S7, no cracking was generated prior to hot rolling, but edge cracking was generated in hot rolling. In Test No. S5, the value derived from formula (1) is more than 30, while the value derived fro formula (2) is more than 17 in Test No. 7. Each case does not satisfy the specified requirement according to the present invention, thus ending up to generating edge cracking in hot rolling.

Based on above test results, it was confirmed that the refinement of chemical composition in weld metal matters greatly and is effective, thus the present invention proves to be sufficiently effective.

EXAMPLE 2

The test result shown in above Example 1 was acquired by hot rolling using a test rolling mill that was simulated to a commercial rolling mill in commercial operations on a reduced scale of ½ through ⅕. Thus, based on this test result, it becomes necessary to estimate a required thickness of a protecting material for prevention of edge cracking in commercial operations.

A workpiece material to be rolled as a test block was constructed by bonding a protecting material having chemical composition of the steel shown in Table 1 onto side end faces of a base metal bloom having chemical composition shown in Table 1, using electron beam welding method, subsequently heated and subjected to hot rolling process by using a commercial rolling mill for evaluation of various tests.

In Table 4, all testing parameters such as Steel No., Dimension of Base Metal Block, Thickness of Protecting Material, Welding Condition, Finishing Thickness, Total Reduction Ratio, and Finishing Temperature are summarized along with the generation of edge cracking and its evaluation.

TABLE 4

| | Steel No. | | Dimension of Base Metal Block | | | Thickness of Protecting | Electron Beam Welding Condition | | |
|---|---|---|---|---|---|---|---|---|---|
| Test No. | Base Metal | Protecting Material | Thickness (mm) | Width (mm) | Length (mm) | Material (mm) | Welding Current (mA) | Welding Speed (mm/min) | Scanning Amplitude of Electron Beam (mm) |
| B1 | M1 | P1 | 90 | 2000 | 1050 | 20 | 350 | 120 | ±2 |
| B2 | M1 | P1 | 90 | 2000 | 1050 | 20 | 350 | 120 | ±2 |
| B3 | M1 | P1 | 90 | 2000 | 1050 | 20 | 350 | 120 | ±2 |
| B4 | M1 | P1 | 90 | 2000 | 1050 | 10 | 350 | 120 | ±2 |
| B5 | M1 | P1 | 90 | 2000 | 1050 | 8 | 350 | 120 | ±2 |
| B6 | M1 | P1 | 90 | 2000 | 1050 | 0 | 350 | 120 | ±2 |

| Test No. | Heating Temperature × Duration (° C. × h) | Finishing Thickness (mm) | Total Reduction Ratio (—) | Finishing Temperature (° C.) | Test Results Edge Cracking | Evaluation |
|---|---|---|---|---|---|---|
| B1 | 1180 × 6 | 5.0 | 18 | 605 | No Crack | O |
| B2 | 1180 × 6 | 5.0 | 18 | 710 | No Crack | O |
| B3 | 1180 × 6 | 5.0 | 18 | 800 | No Crack | O |
| B4 | 1180 × 6 | 5.0 | 18 | 800 | No Crack | O |
| B5 | 1180 × 6 | 5.0 | 18 | 800 | Small Edge Crack | X |
| B6 | 1180 × 6 | 5.0 | 18 | 800 | Large Edge Crack | XX |

Here, it is classified regarding edge cracking such that, when the length of a crack indication is less than 0.1 mm, it is evaluated as "No Crack" indicated by symbol O, while the case when the length of a crack indication is not less than 0.1 mm but less than 18 mm is judged as "Small Edge Crack" indicated by symbol X and further the case when the length of a crack indication is not less than 80 mm but not more than 120 mm is judged as "Large Edge Crack" indicated by symbol XX.

Also, a pass schedule of hot rolling is listed in Table 5.

TABLE 5

| | Number of Pass | | | | | | | | | | |
|---|---|---|---|---|---|---|---|---|---|---|---|
| | 1 | 2 | 3 | 4 | 5 | 6 | 7 | 8 | 9 | 10 | 11 |
| In-process Material Thickness (mm) | 85 | 66 | 47 | 30 | 20 | 13 | 10 | 7.5 | 6.1 | 5.4 | 5.0 |

Among test campaigns designated by Test Nos. B1–B5, inventive examples, that were bonded with protecting materials, Test Nos. B1–B3 were conducted in such a way that the finishing temperature each was altered, and Test Nos. B4 and B5 were conducted in such a way that each thickness of a protecting material was altered.

For reference, Test No. B6 was a comparative test in which a protective material was not bonded.

Among test campaigns designated by Test Nos. B1–B5, inventive examples, no edge cracking was generated, except the case that small edge cracks were generated in Test No. B5 where the thickness of the protecting material was 8 mm. With regard to the small edge cracks generated in Test No. B5, it was confirmed at the stage of removal of the protecting material as finishing process to make final products that the small edge cracks were nothing significant in affecting the quality of products. This consequence sufficiently verifies the effect of bonding a protecting material according to the present invention.

In Test Nos. B1–B4, inventive examples, where each thickness of protecting material was not less than 10 mm, which being a preferable range according to the present invention, no edge cracking was generated, thus ending up to producing better quality products. Also, in Test No. B1, where the finishing temperature was low, a good result was obtained.

Meanwhile, in Test No. B6, a comparative example, large edge cracks were generated, thus badly affect the quality of final steel products, which proved to be an inferior result. It was confirmed by the result based on Example 2 that the present invention proves to be able to prevent the generation of edge cracking even in commercial operations by using commercial rolling mill.

EXAMPLE 3

In Example 3, experimental tests were conducted to evaluate the effect on edge cracking in association with the presence or absence of an insert material by using a base metal as well as a protecting material conforming to the specified range of steel chemical composition according to the present invention.

A test block to be used as a material to be rolled was constructed by using the steel designated by Steel No. M5 (B: 0.42%) in above Table 1, corresponding to the steel containing low B. The test block was constructed by combining a protecting material made of either stainless steel among Steel Nos. P1–P9 in Table 1 into side end faces of each steel bloom with a dimension of 200 mm wide×50 mm thick×100 mm long, which is made of an austenitic stainless steel containing low B, above Steel No. M5, and by subsequently performing aforementioned electron beam welding.

After electron beam welding, a protecting material was ground off in such a way that a bare thickness of a protecting material (a thickness of a protecting material, excluding weld metal), meaning a thickness in traverse direction from a side edge of base metal in the plane parallel to working plane, be adjusted to be in the range of 0–10 mm. In Example 1, the condition of electron beam welding comprised a welding current: 350 mA, a welding speed: 130 mm/min, and a scanning amplitude of an electron beam: ±2 mm. In this regard, so as to enhance welding efficiency, the condition of electron beam welding in Example 3 was altered to comprise a welding current: 400 mA, a welding speed: 170 mm/min, and a scanning amplitude of an electron beam: ±2 mm.

The combination of various base metals and protecting materials, and each insert material type coupled with a thickness and its typical chemical composition are listed in Table 6. As an insert material, a plate type, a powder layer type and a foil type were used as shown in Table 6, where the powder layer was built up onto the face of weld groove configuration by mixing the powder containing B with the binder such as water glass etc. and depositing onto said face like wall painting.

TABLE 6

| | Steel No. | | | Insert Material | | |
|---|---|---|---|---|---|---|
| Test No. | Base Metal | Protecting Material | Presence or Absence | Type | Thickness (mm) | Typical Chemical Composition |
| C1 | M5 | P8 | Absence | — | — | — |
| C2 | M5 | P1 | Absence | — | — | — |
| C3 | M5 | P8 | Presence | Plate | 5 t | 18% Cr-8% Ni-1% B |
| C4 | M5 | P1 | Presence | Plate | 4 t | 18% Cr-8% Ni-1% B |
| C5 | M5 | P8 | Presence | Powder Layer | 1 t | 0.2% B—Fe |
| C6 | M5 | P8 | Presence | Powder Layer | 2 t | 0.2% B—Fe |
| C7 | M5 | P8 | Presence | Powder Layer | 1 t | 5% B—Fe |

(Note)
Powder Layer was built up onto the face of weld groove configuration by mixing the powder containing B with the binder such as water glass etc. and depositing onto said face like wall painting.

Further, each chemical composition of the resultant weld metals in test blocks that were made by combining the base metal made of Steel No. M5 with various protecting materials and insert materials is listed along with valuation result on weld cracking and cracking during rolling in Table 7. The evaluation criteria for weld cracking and cracking during rolling was applied in similar manner to Example 1.

In test campaigns designated as Test Nos. C1–C7, either chemical composition of the base metal, the protecting material, and the weld metal proved to meet the specified range according to the present invention, while fine cracking was recognized in Test Nos. C1 and C2 by observation on cross-section using an optical microscope at the magnification of 100, ending up to generating fine cracking in subsequent hot rolling these test blocks.

Meanwhile, in Test Nos. C3-C7, despite that high speed welding was employed, no cracking was found by observation on each cross-section using an optical microscope at the magnification of 100, and further, no cracking was observed at all after subsequent hot rolling these test blocks. In particular, in Test Nos. C3 and C4, where a B content in each insert material was within preferable range, much superior ductility along with high ability of thermal neutron absorption and low electric resistance at contact portion was obtained.

TABLE 7

| Test No. | Steel No. Base Metal | Steel No. Protecting Material | Insert Material | Chemical Composition (mass %, Balance of Fe and Impurities) | | | | | |
|---|---|---|---|---|---|---|---|---|---|
| | | | | C | Si | Mn | P | S | Cu | Cr |
| C1 | M5 | P8 | Absence | 0.029 | 0.30 | 0.99 | 0.032 | 0.001 | — | 26.76 |
| C2 | M5 | P1 | Absence | 0.022 | 0.29 | 0.99 | 0.023 | 0.002 | — | 18.31 |
| C3 | M5 | P8 | Presence | 0.027 | 0.20 | 0.83 | 0.031 | 0.002 | — | 23.42 |
| C4 | M5 | P8 | Presence | 0.026 | 0.20 | 0.85 | 0.031 | 0.002 | — | 23.16 |
| C5 | M5 | P8 | Presence | 0.027 | 0.20 | 0.84 | 0.032 | 0.002 | — | 19.81 |
| C6 | M5 | P8 | Presence | 0.026 | 0.20 | 0.83 | 0.031 | 0.002 | — | 20.08 |
| C7 | M5 | P8 | Presence | 0.027 | 0.20 | 0.82 | 0.031 | 0.002 | — | 18.75 |

| Test No. | Chemical Composition (mass %, Balance of Fe and Impurities) | | | | | | | Creq – Nieq | Evaluation Results | |
|---|---|---|---|---|---|---|---|---|---|---|
| | Mo | Al | Ni | N | B | Creq | Nieq | | Weld Cracking | Cracking During Rolling |
| C1 | 1.41 | 0.046 | 10.57 | 0.03 | 0.206 | 27.60 | 12.84 | 14.76 | Δ | Δ |
| C2 | 0.63 | — | 9.61 | 0.03 | 0.326 | 17.73 | 11.80 | 5.93 | Δ | Δ |
| C3 | 0.31 | 0.060 | 11.05 | 0.03 | 0.591 | 21.07 | 13.10 | 7.97 | O | O |
| C4 | 0.32 | 0.060 | 10.92 | 0.03 | 0.587 | 20.85 | 12.94 | 7.90 | O | O |
| C5 | 0.32 | 0.059 | 9.33 | 0.03 | 0.594 | 17.46 | 11.37 | 6.09 | O | O |
| C6 | 0.28 | 0.058 | 9.15 | 0.03 | 0.571 | 17.80 | 11.17 | 6.63 | O | O |
| C7 | 0.27 | 0.058 | 8.95 | 0.03 | 0.582 | 16.41 | 10.98 | 5.40 | O | O |

(Note)
Evaluation Criteria
O: No Cracking, indicating good
Δ: indicating that fine cracking was generated

INDUSTRIAL APPLICABILITY

According to the present invention, the generation of edge cracking can be prevented and a stainless steel products containing B under high productivity and with excellent quality can be provided by bonding a protecting material onto a side end face of a stainless steel bloom containing high B, where being applied by high-efficiency electron beam welding method, and then rolling it. Further, by using an insert material during weld bonding, the crack sensitivity of weld metal can be significantly reduced.

Hence, a stainless steel products containing B being made as above according to the present invention can be utilized, for instance, as a material for neutron shielding container in equipments regarding nuclear power plants, and further can be widely applied for function-related usage such as a separator of fuel cell and the like, where the function matters, thus enabling to contribute the development of industrial field where these are manufactured and made use of.

The invention claimed is:

1. A stainless steel slab containing B, wherein a protecting material made of a stainless steel containing B of 0.3 mass % or less is joined onto at least two faces across the bloom from each other, excluding a working plane, in a stainless steel bloom containing B of 0.3–2.5 mass %, being integrated into one-piece by forming a weld metal comprising a stainless steel with chemical composition that satisfies the relationship expressed by formulas (1)–(4) as below;

$$15 \leq Cr\ eq \leq 30 \tag{1}$$

$$4 \leq Cr\ eq - Ni\ eq \leq 17 \tag{2}$$

where, $$Cr\ eq = Cr + 1.5 \times Si + Mo - 5 \times B \tag{3}$$

$$Ni\ eq = Ni + 30 \times (C+N) + 0.5 \times Mn \tag{4}$$

Herein, each symbol of a chemical element designates the content (mass %) of relevant chemical element contained in steel.

2. A stainless steel slab containing B according to claim 1, wherein an insert material containing B of 0.4–2.5 mass % is interposed between above stainless steel bloom and above protecting material.

3. A stainless steel slab containing B according to claim 1, wherein the thickness of above protecting material is 10 mm or more.

4. A stainless steel slab containing B according to claim 2, wherein the thickness of above protecting material is 10 mm or more.

5. A method for production of a stainless steel product containing B, wherein a protecting material made of a stainless steel containing B of 0.3 mass % or less is joined onto at least two faces across the bloom from each other, excluding a working plane, in a stainless steel bloom containing B of 0.3–2.5 mass %, being integrated into one-piece by applying electron beam welding method to form an intervening weld metal comprising a stainless steel with chemical composition that satisfies the relationship expressed by formulas (1)–(4) as below, and subsequently subjected to heating followed by processing;

$$15 \leq Cr\ eq \leq 30 \quad (1)$$

$$4 \leq Cr\ eq - Ni\ eq \leq 17 \quad (2)$$

where, $$Cr\ eq = Cr + 1.5 \times Si + Mo - 5 \times B \quad (3)$$

$$Ni\ eq = Ni + 30 \times (C+N) + 0.5 \times Mn \quad (4)$$

Herein, each symbol of a chemical element designates the content (mass %) of relevant chemical element contained in steel.

6. A method for production of a stainless steel product containing B according to claim 5, wherein an insert material containing B of 0.4–2.5 mass % is interposed between above stainless steel bloom and above protecting material.

7. A method for production of a stainless steel product containing B according to claim 5, wherein the thickness of above protecting material is 10 mm or more.

8. A method for production of a stainless steel product containing B according to claim 6, wherein the thickness of above protecting material is 10 mm or more.

9. A neutron shielding container made by using a stainless steel product containing B that is produced by a method according to claim 5.

10. A neutron shielding container made by using a stainless steel product containing B that is produced by a method according to claim 6.

11. A separator of a fuel cell made by using a stainless steel product containing B that is produced by a method according to claim 5.

12. A separator of a fuel cell made by using a stainless steel product containing B that is produced by a method according to claim 6.

* * * * *

UNITED STATES PATENT AND TRADEMARK OFFICE
CERTIFICATE OF CORRECTION

PATENT NO. : 7,170,073 B2
APPLICATION NO. : 11/076943
DATED : January 30, 2007
INVENTOR(S) : Ishida et al.

It is certified that error appears in the above-identified patent and that said Letters Patent is hereby corrected as shown below:

Title Page, item [75]
Inventor Kazuhiro Ishida should read --Kazuhiko Ishida--

Signed and Sealed this

Seventeenth Day of June, 2008

JON W. DUDAS
*Director of the United States Patent and Trademark Office*